(12) United States Patent
Chaki et al.

(10) Patent No.: US 9,002,782 B2
(45) Date of Patent: Apr. 7, 2015

(54) HYPER-LATTICE MODEL FOR OPTIMIZED SEQUENCING OF ONLINE ANALYTICAL PROCESSING (OLAP) OPERATIONS ON DATA WAREHOUSES

(75) Inventors: Nabendu Chaki, Kolkata (IN); Soumya Sen, Kolkata (IN)

(73) Assignee: University of Calcutta, West Bengel (IN)

( * ) Notice: Subject to any disclaimer, the term of this patent is extended or adjusted under 35 U.S.C. 154(b) by 42 days.

(21) Appl. No.: 13/496,705

(22) PCT Filed: Nov. 30, 2010

(86) PCT No.: PCT/IB2010/003058
§ 371 (c)(1),
(2), (4) Date: Mar. 16, 2012

(87) PCT Pub. No.: WO2012/001455
PCT Pub. Date: Jan. 5, 2012

(65) Prior Publication Data
US 2012/0179643 A1 Jul. 12, 2012

(30) Foreign Application Priority Data
Jun. 28, 2010 (IN) .............................. 699/KOL/2010

(51) Int. Cl.
G06F 7/00 (2006.01)
G06F 17/30 (2006.01)

(52) U.S. Cl.
CPC ................................ *G06F 17/30592* (2013.01)

(58) Field of Classification Search
USPC ................................................ 707/607, 803
See application file for complete search history.

(56) References Cited

U.S. PATENT DOCUMENTS

| 5,978,788 | A * | 11/1999 | Castelli et al. ........................ 1/1 |
| 6,535,872 | B1 * | 3/2003 | Castelli et al. ........................ 1/1 |
| 7,587,410 | B2 | 9/2009 | Sourov et al. |
| 8,024,287 | B2 * | 9/2011 | Abouzied et al. ............. 707/603 |
| 2002/0091707 | A1 | 7/2002 | Keller |
| 2009/0055439 | A1 | 2/2009 | Pai et al. |
| 2009/0327330 | A1 * | 12/2009 | Abouzied et al. ............. 707/102 |

FOREIGN PATENT DOCUMENTS

| JP | 2002-007435 A | 1/2002 |
| KR | 1020090059656 A | 6/2009 |

OTHER PUBLICATIONS

Sen et al., 2009 Fourth International Conference on Computer Sciences and Convergence Information Technology, pp. 1271-1275.*
S. Agarwal, R. Agrawal, P. M. Deshpande, A. Gupta, J. F. Naughton, R. Ramakrishnan and S. Sarawagi; "On the computation of multidimensional aggregates"; Proc. of 1996 International Conference on Very Large Data Bases VLDB'96.*

(Continued)

*Primary Examiner* — Cheyne D Ly
(74) *Attorney, Agent, or Firm* — Brundidge & Stanger, P.C.

(57) ABSTRACT

Systems and methods are provided for Online Analytical Processing of data included within data warehouses. According to one example, a method for adding a dimension to a hyper-lattice structure is provided and includes adding a new base cuboid to a hyper-lattice that describes functionality of the data warehouses. According to another example, a method for determining an optimal path through an existing hyper-lattice by which to generate a destination cuboid from a source cuboid is also provided.

16 Claims, 11 Drawing Sheets

(56) References Cited

OTHER PUBLICATIONS

Harinarayan et al., Implementing Data Cubes Efficiently, SIGMOD '96, Montreal, Canada, pp. 205-216.*
Fend et al., PrefixCube: Prefix-sharing Condensed Data Cube, DOLAP '04, Nov. 12-13, Washington, DC, USA, pp. 38-47.*
Roussopoulos et al., Cubetree: Organization of and Bulk Incremental Updates on the Data Cube, SIGMOD '97, USA, pp. 89-99.*
International Search Report and Written Opinion issued by the Australian Patent Office in PCT/IB2010/003058, dated Feb. 24, 2011.
Xin, et al., "Star-Cubing: Computing Iceberg Cubes by Top-Down and Bottom-Up Integration", Proceedings of the 29th VLDB Conference, Berlin, Germany 2003, Published Nov. 20, 2006, [online] [retrieved Feb. 16, 2011]. Retrieved from the Internet<URL: http://citeseerx.ist.psu.edu/viewdoc/download?doi=10.1.1.75.3366&rep=rep1&type=pdf>.
Tam, et al., Datacube: Its Implementation and Application in OLAP Mining, Published Sep. 1998. [online] [retrieved on Feb. 16, 2011]. Retrieved from the Internet<URL: http://citeseerx.ist.psu.edu/viewdoc/summary? doi=10.1.1.51.2647>.
Beyer, et al., "Bottom-Up Computation of Sparse and Iceberg CUBEs", Proceedings of the 1999 ACM SIGMOD International Conference on Management of Data, published Jun. 1999, vol. 28, Issue 2, ACM SIGMOD Record. [online] [retrieved on Feb. 16, 2011]. Retrieved from the Internet <URL: http://citeseerx.ist.psu.edu/viewdoc/download?doi=10.1.1.48.5900&rep=rep1&type=pdf.
Agarwal, et al., On the Computation of Multidimensional Aggregates, Proceedings of the 22nd VLDB Conference Mumbai (Bombay) India, 1996, pp. 506-521. [online] [retrieved on Feb. 16, 2011]. Retrieved from the Internet<URL:http://citeseerx.ist.psu.edu/viewdoc/summary?doi=10.1.1.87.2996>.
T. Shimada, et al., "Distributed Construction for Data Cube from Tuple Stream", DEIM Forum 2010 w/Engl. abstract.
S. Agarawal, et al., "On the Computation of Multidimensional Aggregates", pp. 506-521, 1996.
Chen, C., et al., "Graph OLAP: Towards Online Analytical Processing on Graphs," Proceedings of the 8th IEEE International Conference on Data Mining (ICDM 2008), pp. 103-112 (Dec. 15-19, 2008).
Chen, W.-C., et al., "A Composite Data Model in Object-Oriented Data Warehousing," Proceedings of the 31st International Conference on Technology of Object-Oriented Language and Systems, pp. 400-405 (1999).
Dash, A. K. and Agarwal, R., "Dimensional Modeling for a Data Warehouse," ACM SIGSOFT Software Engineering Notes, vol. 26, No. 6, pp. 83-84 (Nov. 2001).
Ju, C. And Han, M., "Effectiveness of OLAP-based Sales Analysis in Retail Enterprises," ISECS International Colloquium on Computing, Communication, Control, and Management, vol. 3, pp. 240-244 (Aug. 3-4, 2008).
Konovalov, A., "Object-Oriented Data Model for Data Warehouse," ADBIS '02 Proceedings of the 6th East European Conference on Advances in Databases and Information Systems, Eds. Manolopoulos, Y. and Návrat, P., pp. 319-325, (Sep. 8, 2002).
Lin, C. X., et al., "Text Cube: Computing IR Measures for Multidimensional Text Database Analysis," Eighth IEEE International Conference on Data Mining, pp. 905-910 (Dec. 15-19, 2008).
Sarkar, A., et al., "Conceptual Level Design of Object Oriented Data Warehouse: Graph Semantic Based Model," INFOCOMP Journal of Computer Science, Issue 4, pp. 60-70 (Sep. 23, 2009).
Zhang, S.-I. And Zhang, J.-F. "A new classification mining model based on the data warehouse," International Conference on Machine Learning and Cybernetics, vol. 1, pp. 168-171 (Nov. 2-5, 2003).
Zhang, Y., et al., "Spatial Data Cube: Provides Better Support for Spatial Data Mining," Proceedings of IEEE International Conference on Geoscience and Remote Sensing Symposium, vol. 2 (Jul. 25-29, 2005).

* cited by examiner

One Dimension Cuboid

| Dolls | Toy Cars | Puzzles |
|-------|----------|---------|
| 287   | 276      | 299     |

Two Dimension Cuboid

|      | Dolls | Toy Cars | Puzzles |
|------|-------|----------|---------|
| 2007 | 121   | 71       | 67      |
| 2008 | 97    | 93       | 93      |
| 2009 | 69    | 112      | 139     |

HYPER-LATTICE MODEL FOR OPTIMIZED SEQUENCING OF ONLINE ANALYTICAL PROCESSING (OLAP) OPERATIONS ON DATA WAREHOUSES

CROSS-REFERENCE TO RELATED APPLICATION

The present application claims priority to a corresponding patent application filed in India and having application number 699/KOL/2010, filed on Jun. 28, 2010, the entire contents of which are incorporated by reference. The present application is also a U.S. National Phase Application pursuant to 35 U.S.C. 371 of International Application No. PCT/IB2010/003058, filed on Nov. 30, 2010, the entire contents of which are herein incorporated by reference.

TECHNICAL MELD

This application relates generally to data warehousing techniques and Online Analytical Processing (OLAP) methods and systems.

BACKGROUND

Unless, otherwise indicated herein, the materials described in this section are not prior art to the claims in this application and are not admitted to be prior art by inclusion in this section.

In order to make informed business decisions, many organizations employ some form of data warehousing and analytical processing. A data warehouse is an electronic repository of information collected from one or more data sources. Typically, a data warehouse will contain a large cache of information, and at any given time, a particular subset of that information may be desired. To retrieve the desired data and present the data in a preferred fashion (e.g., on a computer screen or other type of graphic user interface (GUI), an analyst may perform what is known as online analytical processing (OLAP) of the warehouse data.

For example, a sales organization may desire to know which salesmen sold over a certain number units of a particular type of product during a specific time frame in a specific region of a specific country. The sales organization's data warehouse or data stores may contain sales data corresponding to all of the salesmen for multiple products across long time spans and across, the entire world. OLAP functionality provides a manner for processing the warehouse data, retrieving the desired portion of the data, and presenting the data in an appropriate form.

As organizations grow and expand, so too do their data stores. This, compounded with the increasing ease of collecting data (e.g., due to more sophisticated point-of-sale technologies, improved marketing techniques, etc.), results in exponential increases in data warehouse sizes. As a result, the cost of OLAP queries (measured by processing power and time, for example) rises, leading to poor user experience. To deal with this, more efficient data storage, more efficient data representation techniques, and more efficient OLAP routines are desired.

SUMMARY

In accordance with one embodiment, a method for modifying an existing data warehouse lattice structure is provided. The method includes creating an additional cuboid that forms a base cuboid for a newly inserted dimension and existing dimensions of a hyper-lattice. The method further includes associating a plurality of intermediate dimension patterns with the additional base cuboid where at least one of the dimension patterns exists in the existing lattice structure, and where at least one of the dimension patterns does not currently exist in the existing lattice structure.

In another embodiment, software instructions are provided for determining an optimal path through a data warehouse lattice to generate a destination cuboid from a source cuboid. The instructions include determining a set of cuboids that are able to be generated from the source cuboid, determining which cuboids in the set are summarized on at least the same dimensions as the destination cuboid, calculating the size of each cuboid in the set that is summarized on at least the same dimension as the destination cuboid in the lattice, and determining which cuboid has a smallest size. An optimal path is accordingly determined as a path that includes at least the smallest size cuboid.

In a further embodiment, an OLAP sever is provided having software instructions stored therein for determining an optimal path through a hyper-lattice to generate a destination cuboid from a source cuboid. The source cuboid and destination cuboid may correspond to the same base cuboid in the hyper-lattice or may correspond to different base cuboids in the hyper-lattice.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3A is an illustration of an example data cuboid wherein fact data is summarized on one dimension.

FIG. 3B is an illustration of an example data cuboid wherein fact data is summarized on two dimensions.

DETAILED DESCRIPTION

Figure 1:
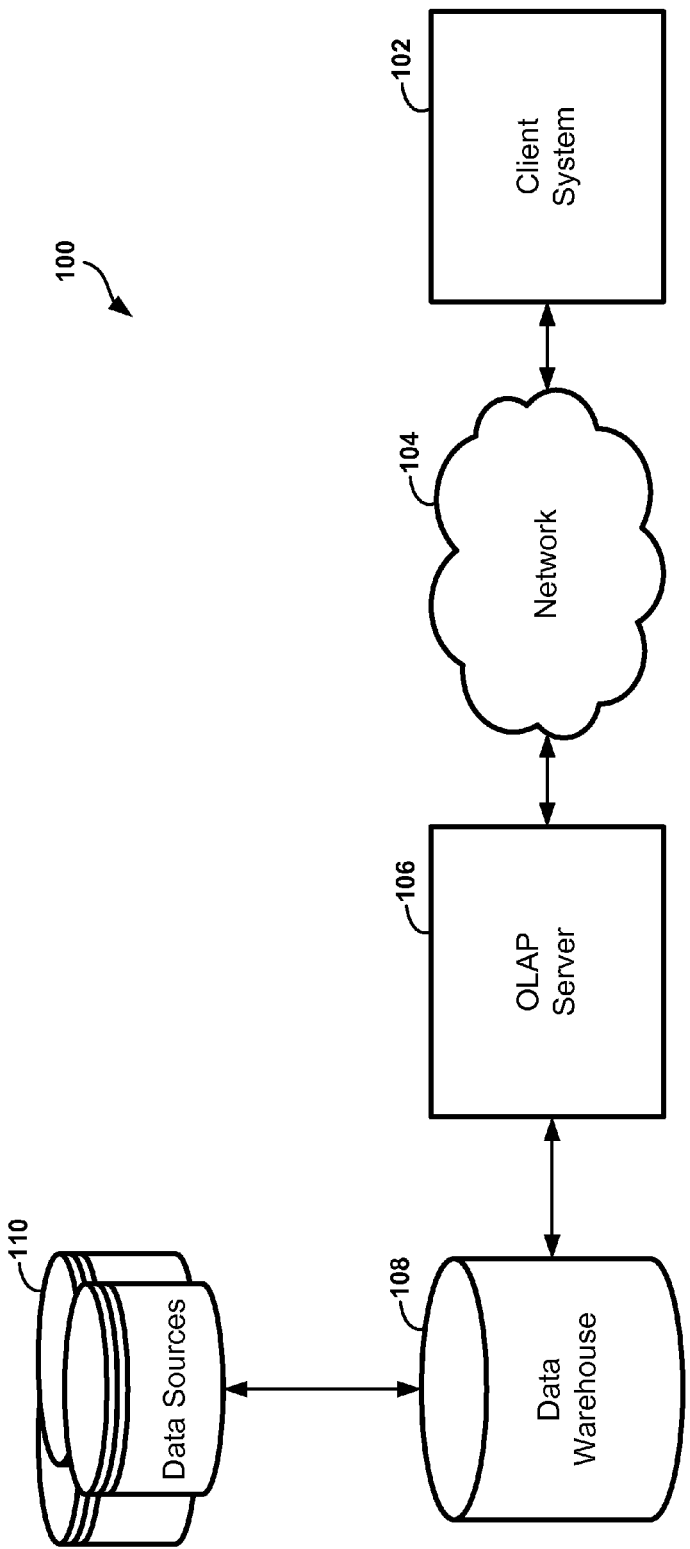
FIG. 1 is a block diagram illustrating an example system in which at least some of the embodiments presented herein may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are examples of algorithms and corresponding systems for performing data warehousing and Online Analytical Processing (OLAP). Many examples and embodiments are described, and will be apparent from the following description and drawings.

FIG. 1 is a block diagram illustrating an example data warehousing configuration 100. In configuration 100, an analyst can operate client system 102 and issue OLAP queries through network 104 to OLAP server 106. Client system 102 may be, for example, any computing device (e.g., a personal computer) coupled to network 104. Network 104 can be a local area network, such as a corporate Ethernet, or can be a wide area network, such as the internet.

OLAP server 106 and data warehouse 108 are shown in configuration 100 as separate entities, but they could just as well comprise a single entity (e.g., a computer). OLAP server 106 may contain software and hardware designed to process data stored in warehouse 108. The OLAP server may also contain various representations of the warehouse data, including data relationship tables, metadata, as well as software designed to facilitate data representation.

Data warehouse 108 represents the physical repository of data as well as the various relationships between the data. Warehouse 108 may store a categorical subset of an organization's entire data set, which is represented by data sources 110. For instance, data sources 110 may comprise one or more repositories that store all of the organization's data (e.g., employee data, sales data, shareholder data, vendor data, etc.), while data warehouse 108 may comprise just a categorical portion of that data (e.g., sales data). Data sources 110 could also include other data warehouses, for instance.

A data warehouse, such as data warehouse 108, is organized around one or more central themes, referred to as "facts." Facts are usually numerical measures (e.g., number of sales), and may be associated with one or more "dimensions." Dimensions generally define various categories or classes that further define the particular facts. For instance, one type of fact may be total sales, and possible dimensions of that fact could include type of product sold (e.g., toys, house wares), time frame (e.g., years, months), location, supplier, etc.

Figure 2:
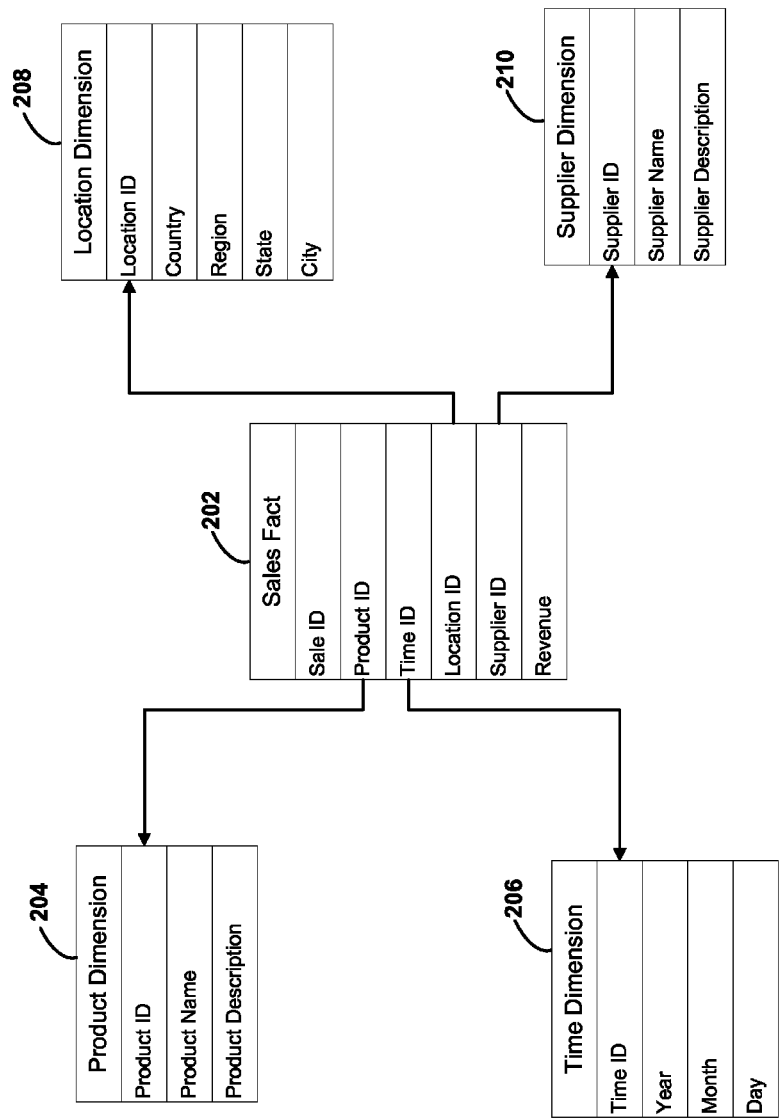
FIG. 2 is a diagram illustrating example fact and dimension data tables.

The fact and dimension data can be stored in the data warehouse using relational database tables as illustrated by FIG. 2. FIG. 2 illustrates an example sales fact table 202 and corresponding example product 204, time 206, location 208, and supplier dimension tables 210. Each entry in sales fact table 202 may correspond to a particular sales event, the details of which are defined by the individual dimension IDs (i.e., product ID, time ID, location ID, supplier ID). Each sale event may also be assigned a unique sale ID and can be associated with other data as well (e.g., revenue).

For example, entries in the sales fact table 202 may be associated with a particular product. The product ID serves as a link to the product dimension table 204, which may contain information regarding several different products (e.g., name, description, etc.). Entries in the sales fact table 202 may also be associated with a particular time period. The time ID serves as a link to the time dimension table 206, which may contain information regarding several different time periods (e.g., day, month, year, etc.) Entries in the sales fact table 202 may also be associated with a particular location. The location ID serves as a link to the location dimension table 208, which may contain information regarding several different locations (e.g., country, region, state, city, etc.). Entries in the sales fact table 202 may also be associated with a particular supplier. The supplier ID serves as a link to the supplier dimension table 210, which may contain information regarding several different suppliers (e.g., name, description, etc.).

The data stored amongst a set of fact and dimension tables (e.g., the sales data stored amongst tables 202-210) can be visually represented using one or more of the available dimension. Data presented using 'n' dimensions is referred to as an n-dimensional "data cube" or "cuboid." For example, FIG. 3A illustrates an example one-dimension (1-D) cuboid 302 using sales data summarized across the "type" dimension. The "type" dimension is shown as having three separate entries for which to summarize the sales facts across, "Dolls," "Toy Cars," and "Puzzles." Cuboid 302 thus contains three cells containing example sales values of 287, 276, and 299 for dolls, toy cars, and puzzles, respectively.

The size of a cuboid is dependent upon, how many cells are contained within the cuboid. Therefore, the size of cuboid 302 is said to be three since there are three cells containing the fact data. The size of the cuboid 302 is also said to be three since there are three types (i.e., Dolls, Toy Cars, Puzzles) summarizing the fact data. The size of any particular dimension may be determined by calculating the number of unique entries in the corresponding dimension table. Other ways of determining the size of a dimension are possible as well.

The sum of all sales across all dimensions is referred to as a zero-dimension (0-D) cuboid (not shown) and would contain a single cell, which, in the example of FIG. 3A, would be 862.

FIG. 3B illustrates an example two-dimension (2-D) cuboid 304 using sales data summarized across "type" and "time" dimensions. Often, a particular dimension may have different ways of representing the facts associated with that dimension. In this example, the time dimension could be represented using day, month, or year, and FIG. 3B illustrates a representation using years. Other 2-D cuboids can be generated as well using any two of the other available dimensions in combination.

The size of cuboid 304 (i.e., the number of cells in cuboid 304) may be determined by multiplying the size of each dimension summarized in cuboid 304. The size of the "type" dimension is three and the size of the "time" dimension is three (since there are three years summarizing the fact data). Therefore, the size of cuboid 304 is 3×3=9.

Figure 4:
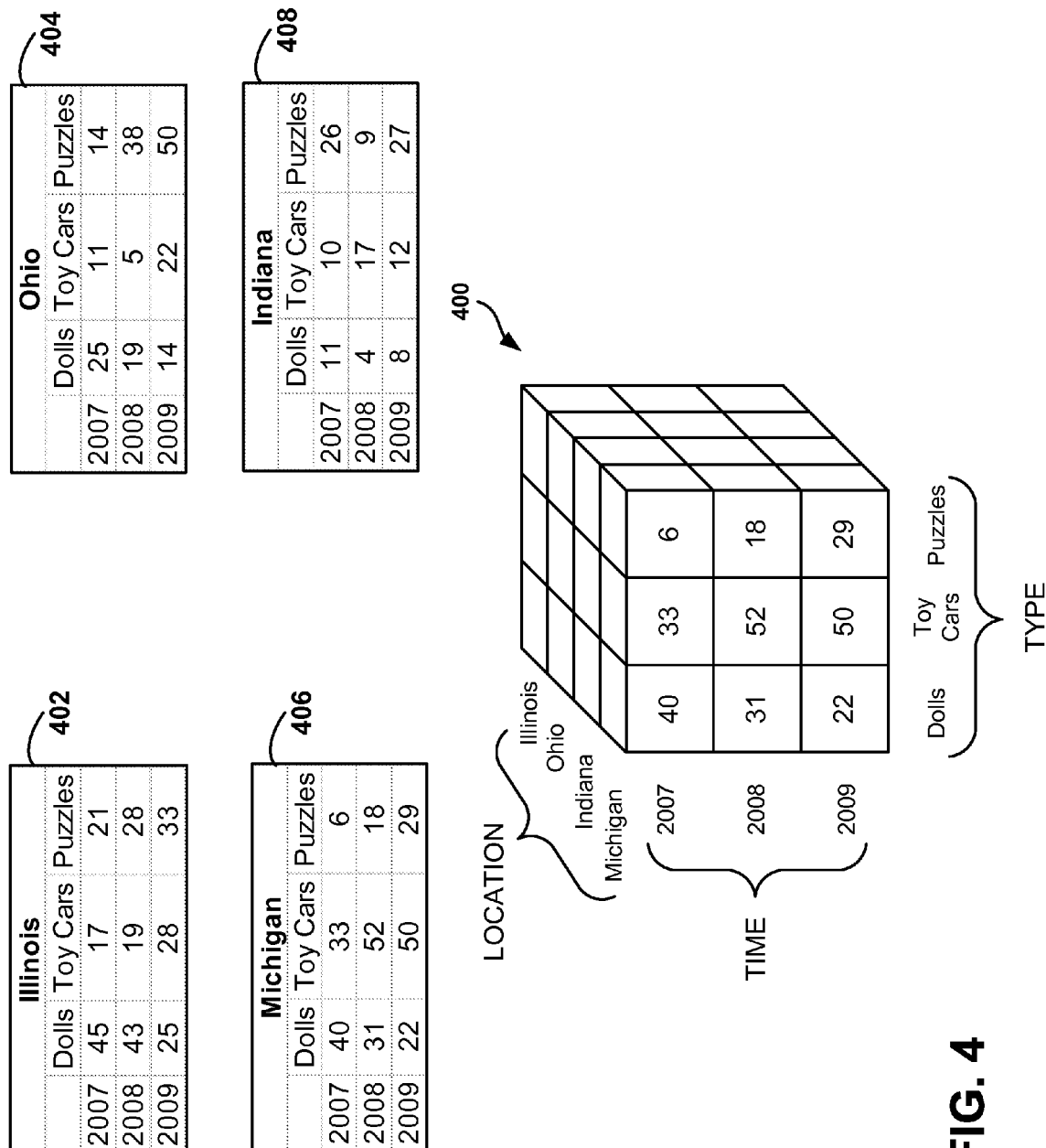
FIG. 4 is an illustration of an example data cuboid wherein fact data is summarized on three dimensions.

FIG. 4 illustrates an example of a visual or conceptual three-dimension (3-D) cuboid 400 using dimensions "type," "time," and "location." A 3-D cuboid can be thought of as a set of juxtaposed 2-D cuboids. For example, 3-D cuboid 400 may be thought of as a set of juxtaposed 2-D cuboids 402, 404, 406, and 408. Each 2-D cuboid 402-408 illustrates sales facts across two dimensions for a limited portion of the third dimension. Together, the set of 2-D cuboids 402-408 thus completes the third dimension and comprises the 3-D cuboid 400. For example, the front face of 3-D cuboid 400 corresponds to 2-D cuboid 406, while the next "tiers" of the 3-D cuboid 400 correspond to 2-D cuboids 408, 404, and 402 respectively.

The size of 3-D cuboid 400 may be determined by multiplying the size of each dimension summarizing cuboid 400.

For example, the size of the "type" dimension is three, the size of the "time" dimension is three, and the size of the "location" dimension is four. Thus, the size of cuboid 400 is 3×3×4=36.

Figure 5:
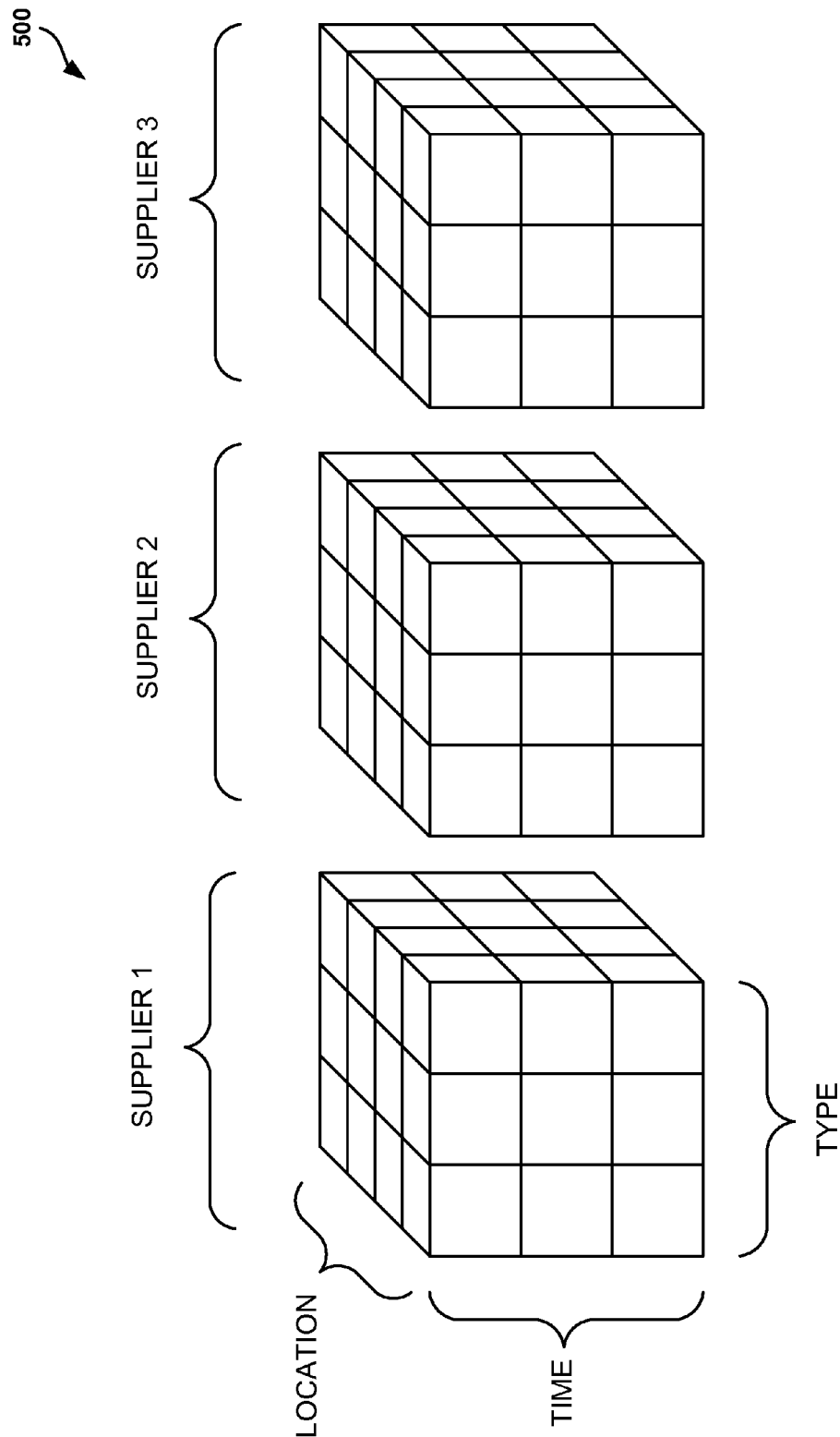
FIG. 5 is an illustration of an example data cuboid wherein fact data is summarized on four dimensions.

FIG. 5 illustrates an example of a visual or conceptual four-dimension (4-D) cuboid 500 using dimensions "type," "time," "location," and "supplier." A 4-D cuboid can be thought of as a set of juxtaposed 3-D cuboids. As shown in FIG. 5 for example, 4-D cuboid 500 may be comprised of a "supplier 1" cuboid juxtaposed with a "supplier 2" cuboid juxtaposed with a "supplier 3" cuboid.

Figure 6:
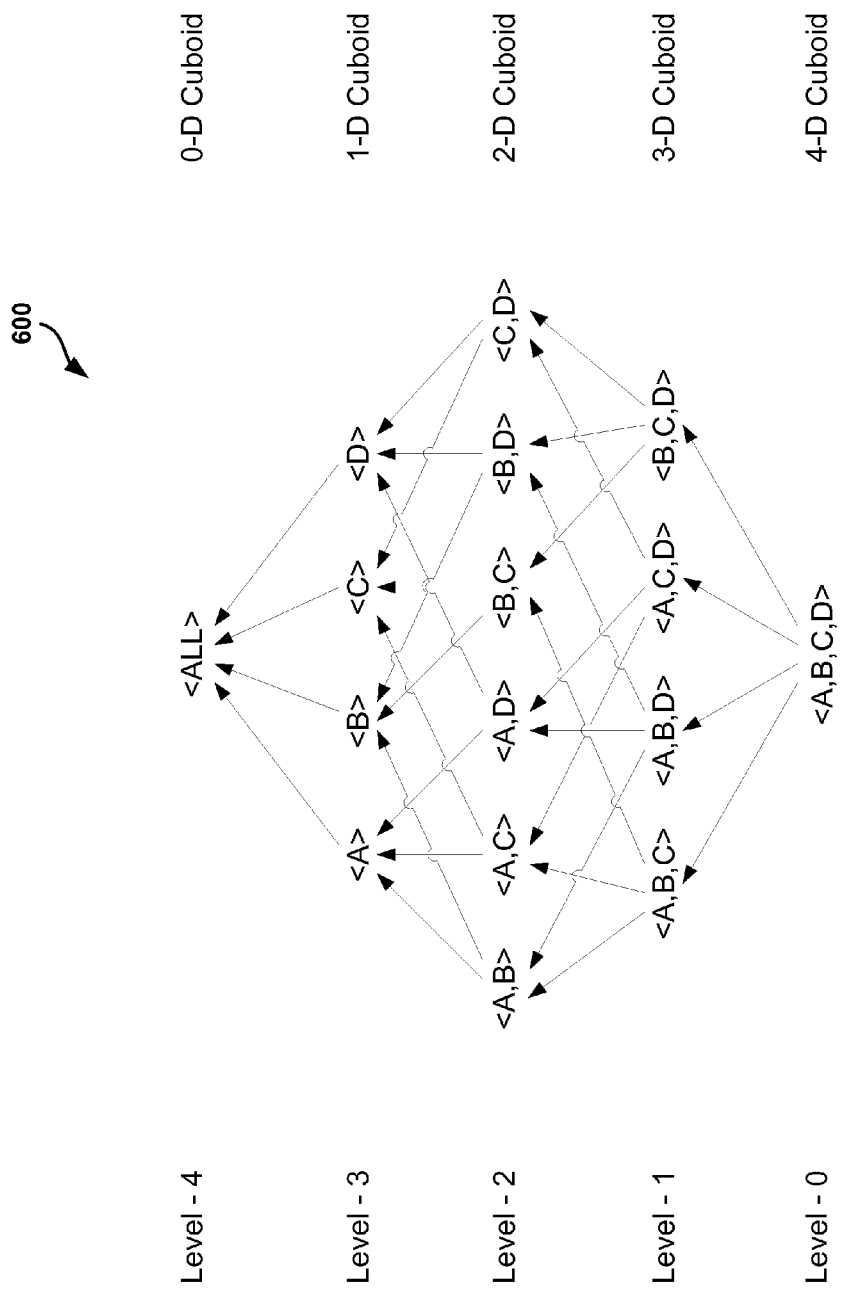
FIG. 6 is an illustration of an example lattice of cuboids.

Given a set of dimensions, cuboids representing each possible combination of the dimensions may be generated. In order to facilitate generation of those cuboids as the cuboids are needed, a representation of the possible dimension patterns is stored at the data warehouse. Such a representation of cuboid dimension patterns is referred to as a lattice of cuboids, or simply a lattice. FIG. 6 illustrates an example lattice 600 corresponding to four dimensions represented by the letters A, B, C, and D. These dimensions could correspond to the dimensions described in FIG. 2, or could correspond to other dimensions, for example. The cuboid that holds the lowest level of summarization is referred to as the base of the lattice, or simply the base cuboid. The base cuboid of lattice 600 is represented by dimension pattern <A,B,C,D>, and sits at level 0. Moving up lattice 600, intermediate cuboids sit at levels 1, 2, and 3 and represent various levels of summarization. By way of example, level 2 cuboid <A,B> may represent cuboid 304, and level 1 cuboid <A,B,C> may represent cuboid 400. The apex cuboid is denoted by <ALL> and, in lattice 600, sits at level 4. The apex cuboid represents a summarization across all dimensions.

A lattice can also serve as a roadmap that defines paths for summarization from a lower level cuboid to a higher level cuboid. Such a summarization is referred to as a roll-up operation. Additionally, a lattice may serve as a roadmap that defines paths for summarization from a higher level cuboid to a lower level cuboid. Such a summarization is referred to as a drill-down operation.

In lattice 600, arrows illustrate the paths for summarizing a lower level cuboid to a higher level cuboid. For example, in level 2, cuboid <A,C> can be summarized from the base cuboid via either level 1 cuboid <A,B,C> or level 1 cuboid <A,C,D>. These alternate paths involve varying amounts of storage space and volumes of computation depending on the size of the intermediate cuboids. For instance, a higher level cuboid that sits on a path with a larger intermediate cuboid may have higher computation cost than the same higher level cuboid that sits on a path with a smaller intermediate cuboid. The higher computation costs may be associated with the time or processing power required to generate the intermediate cuboids.

In order to facilitate the computation of the different summarization paths between a lower level cuboid and an upper level cuboid (or vice versa), and to facilitate a determination of which paths have low processing costs, a data warehouse, corresponding OLAP server, or some other entity, may associate unique integer values with each dimension of a lattice. The integer values are referred to as tag numbers. Example of tag numbers (which start at zero and increase by one for each dimension) for the dimensions of lattice 600 are illustrated in an example Tag Number Table (TNT), Table 1.

TABLE 1

| Dimension Name | Tag Number |
| --- | --- |
| A | 0 |
| B | 1 |
| C | 2 |
| D | 3 |

The dimension tag numbers of a lattice may be used to compute tagged-values for the individual cuboids of that lattice. One way to compute a tagged-value for a particular cuboid in a lattice is to take the tag numbers for each dimension of the particular cuboid as exponents of 2 and sum the results. By way of example, to computer the tagged-value of cuboid <A,B,D> in lattice 600, the tag numbers of that cuboid's dimensions are first determined. According to Table 1, the tag numbers of dimensions A, B, and D are 0, 1, and 3, respectively. Therefore, a tagged-value for cuboid <A,B,D> may be computed as $2^0+2^1+2^3=11$. Similarly, the tagged-value for cuboid <C,D> can be computed as $2^2+2^3=12$. Tagged-values may serve as a way to uniquely identify the cuboids in a lattice, as well as a way to determine which dimensions are summarized in a particular cuboid.

During OLAP operations, a situation may arise where a higher level cuboid is desired to be generated from a particular lower level cuboid. For example, a user at client system 102 may desire to view a particular cuboid in a lattice of data warehouse 108. The particular cuboid may not currently exist in any form (except its representation in a lattice) and so the particular cuboid would need to be generated from a lower level cuboid, say for example, the base cuboid.

As mentioned above, in a lattice, two or more paths may exist that connect a higher level cuboid to a lower level cuboid. This represents the possibility of generating the higher level cuboid from the lower level cuboid (or vice versa) via any one of the two or more paths. However, of these possible paths, some may be more advantageous (e.g., from a computing standpoint) to use than others, depending on, for instance, the size of the intermediate cuboids along the paths. Generally, the amount of processing power, memory, and/or time required of an entity (e.g., OLAP sever 106) to generate a cuboid is directly proportional to the size of that cuboid. Therefore, when generating a higher level cuboid from a lower level cuboid (or vice versa), it may be desirable to avoid utilizing a path that contains one or more particularly large cuboids. It also may be desirable to utilize a path having the smallest aggregate cuboid size. In any event, an OLAP server, or perhaps another entity, may carry out a path determination algorithm to determine an appropriate path between two cuboids in a lattice.

Figure 7:
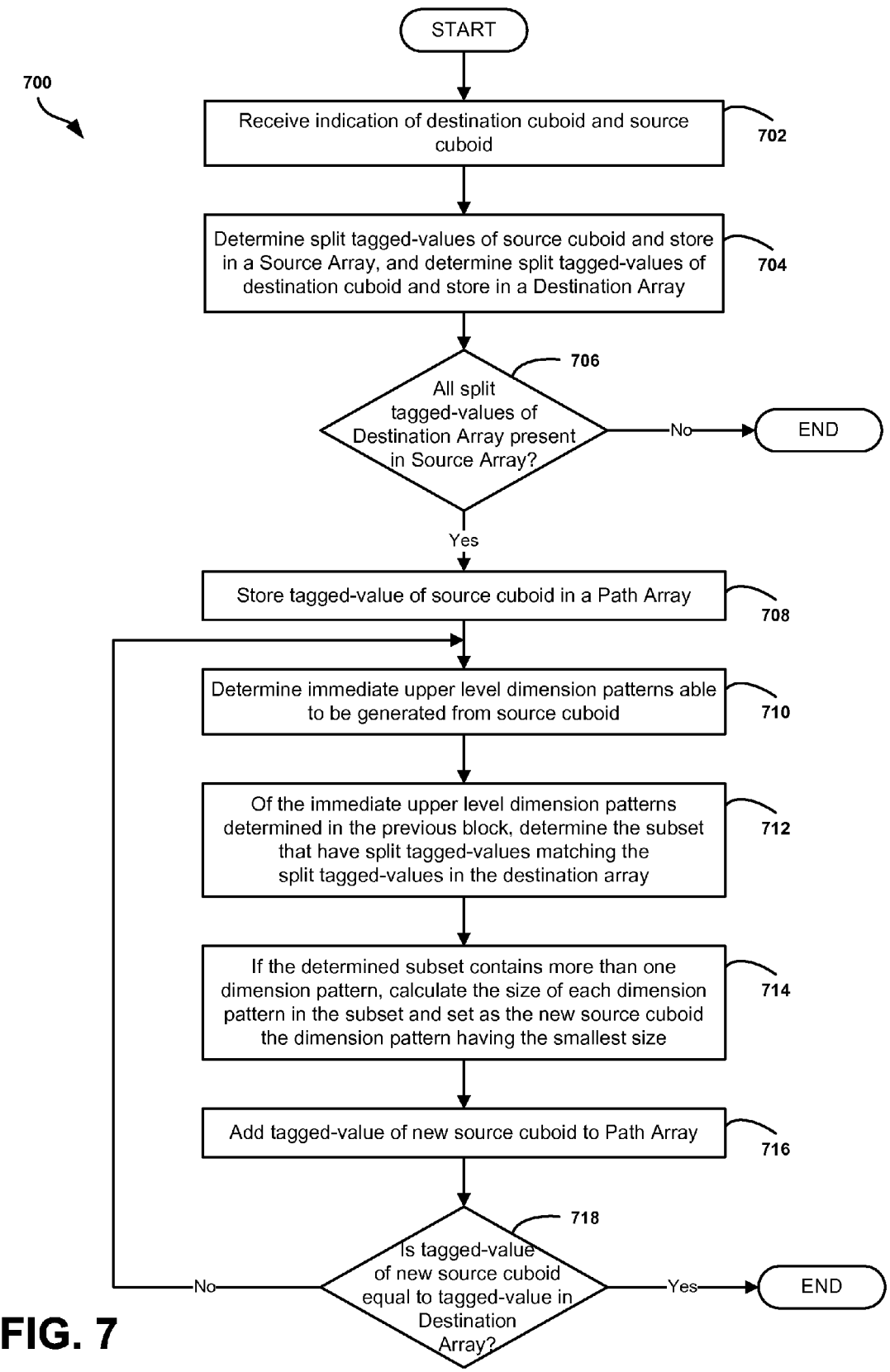
FIG. 7 is a flow diagram illustrating example steps of an optimal path determination algorithm within a hyper-lattice structure that are adapted in accordance with at least some embodiments described herein.

FIG. 7 is a flow diagram illustrating an example algorithm 700 for determining an optimal path between a source cuboid and a destination cuboid. Example algorithm 700 may include one or more operations, functions, or actions as illustrated by one or more of blocks 702, 704, 706, 708, 710, 712, 714, 716, and/or 718. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium (e.g., computer readable storage medium or non-transitory media), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Processing for algorithm 700 may begin at block 702 to receive an indication of a destination cuboid and a source cuboid. A user at client system 102 may, for example, provide an indication of destination cuboid <B,C> of lattice 600 to the OLAP server 106 via network 104. The indication may take the form of the tagged-value of the destination cuboid (i.e., 6), a list of the dimensions of the destination cuboid (i.e., "B, C"), or perhaps some other form altogether. A user may also provide an indication of the source cuboid, which could be, for example, cuboid <A,B,C,D> in lattice 600.

The algorithm continues at block 704 to determine split tagged-values of the source cuboid and a store in a Source Array, and to determine split tagged-values of the destination cuboid and a store in a Destination Array. A cuboid's split tagged-values refer to an array of tagged-values of that cuboid's summarized dimensions. As an example, a source cuboid <A,B,C,D> of lattice 600 is summarized on dimensions A, B, C, and D. Thus, the split tagged-values of that cuboid can be expressed as $\{2^0, 2^1, 2^2, 2^3\}$ or $\{1,2,4,8\}$, according to the tag numbers of the four dimensions indicated in Table 1. Likewise, a destination cuboid <B,C> of lattice 600 is summarized on dimensions B and C. Thus, the split tagged-values of that cuboid can be expressed as $\{2^1, 2^2\}$ or $\{2,4\}$. Split tagged-values $\{1,2,4,8\}$ may be stored as the source array while split tagged-values $\{2,4\}$ may be stored as the destination array.

At block 706, a determination is made of whether all split tagged-values of the Destination Array are present in Source Array. This serves as an indication of whether a path exists in the corresponding lattice connecting the source cuboid to the destination cuboid. If no path exists, (i.e., a split tagged-value is present in the destination array that is not present in the source array), the algorithm ends. If all split tagged-values of the destination array are present in the source array, the algorithm continues at block 708 to store a tagged-value of the source cuboid in a Path Array.

As the algorithm progresses, the path array is updated with tagged-values of intermediate cuboids to generate the optimal path between the source cuboid and the destination cuboid. For example, if the current source cuboid is cuboid <A,B,C,D> of lattice 600, the value "15" is added to the path array.

The algorithm continues at block 710 to determine immediate upper level dimension patterns that may be able to be generated from the source cuboid. These upper level dimension patterns, also referred to as intermediate cuboids, may be determined by consulting the appropriate lattice in data warehouse 108. For example, if the current source cuboid is cuboid <A,B,C,D>, intermediate upper level cuboids able to be generated from <A,B,C,D> would be <A,B,C>, <A,B,D>, <A,C,D>, and <B,C,D>.

Block 710 is followed by block 712, in which of the immediate upper level dimension patterns determined in the previous block, a subset is determined that has split tagged-values matching the split tagged-values in the destination array. Each cuboid in this subset represents a possible intermediate cuboid that may be generated in order to reach the destination cuboid. When there is a choice of which intermediate cuboid to generate in order to reach the destination cuboid, it would be advantageous to generate the smallest of the possible cuboids in order to save processing time and power, for example.

Table 2 illustrates possible intermediate cuboids able to be generated from source cuboid <A,B,C,D> in lattice 600 and corresponding split tagged-values of those cuboids. As mentioned above, the destination cuboid in lattice 600 may be cuboid <B,C>, which has split tagged-values of $\{2,4\}$. Therefore, based on the list of split tagged-values in Table 2, cuboids <A,B,C> and <B,C,D> represent the subset of intermediate cuboids that may be generated in order to reach destination cuboid <B,C> since split tag-values $\{2,4\}$ are present in each split tag-value <A,B,C> and <B,C,D>.

TABLE 2

| Cuboid | Split Tagged-Values |
|---|---|
| <A,B,C> | $\{1,2,4\}$ |
| <A,B,D> | $\{1,2,8\}$ |
| <A,C,D> | $\{1,4,8\}$ |
| <B,C,D> | $\{2,4,8\}$ |

Block 712 is followed by block 714, where if the determined subset contains more than one dimension pattern, the size of each dimension pattern in the subset is calculated and set as the new source cuboid the dimension pattern having the smallest size. If there is only one cuboid in the subset, then that cuboid is set as the new source cuboid. As mentioned above, the size of a cuboid may be determined by multiplying together the sizes of the individual dimensions summarized in the particular cuboid. For example, if the sizes of dimensions A, B, C, and D, are 15, 6, 6, and 10 respectively, then the size of cuboid <A,B,C> is calculated as 15×6×6=540, while the size of cuboid <B,C,D> is calculated as 6×6×10=360. Therefore, cuboid <B,C,D> represents the smallest cuboid of the subset of cuboids that may be generated in order to reach the destination cuboid. Generating this cuboid would potentially save processing time and power compared with generating the <A,B,C> cuboid.

Block 714 is followed by block 716, in which a tagged-value of the intermediate cuboid is added to the Path Array. For example, the tagged-value of cuboid <B,C,D> is added to the current Path Array resulting in a Path Array of $\{15,14\}$.

The algorithm continues at block 718 to determine if this tagged-value of the new source cuboid is equal to a tagged-value in the Destination Array. If yes, then the Path Array contains the tagged-values of the cuboids that comprise an optimal path from the source cuboid to the destination cuboid and the algorithm ends. If the tagged-value of the new source cuboid is not equal to the tagged-value of the destination cuboid, then the algorithm returns to block 710 where each upper level dimension pattern able to be generated from the new source cuboid is determined. In the present example, cuboid <B,C,D> is set as an intermediate cuboid of the optimal path between source and destination cuboid. In the example described above, since the tagged-value of cuboid <B,C,D> (i.e., 14) is not equal to the tagged-value of the destination cuboid <B,C> (i.e., 6), the algorithm returns to block 710 and continues through blocks 712, 714, 716, and 718.

Once the algorithm ends, an optimal path to generate the destination cuboid from the source cuboid in a particular lattice will be represented in the Path Array. The Path Array may be stored in a lookup table, such as Table 3 that lists the tagged-value of the source cuboid, the tagged-value of the destination cuboid, and an optimal path determined by the path determination algorithm 700. The lookup table may be consulted when a particular cuboid in a lattice is desired to be generated from a source cuboid. If an optimal path has already been derived and is listed in the lookup table, there may be no need to re-execute the path determination algorithm.

TABLE 3

| Source Cuboid Tagged-value | Destination Cuboid Tagged-value | Optimal Path |
|---|---|---|
| {15} | {6} | {15,14,6} |

A lattice will exist where fact data can be summarized across any combination of the dimensions in the lattice. For example, in lattice 600, fact data can be summarized on any combination of dimensions A, B, C, and D (e.g., <A,B>, <A,C,D>, <D>, etc.). Such a lattice has a single base cuboid, which may be identified in a Base Cuboid Table (BCT), such as Table 4.

Table 4

| Base Cuboid Pattern | Tagged-value | Level |
|---|---|---|
| <A,B,C,D> | {15} | 0 |

Figure 8:
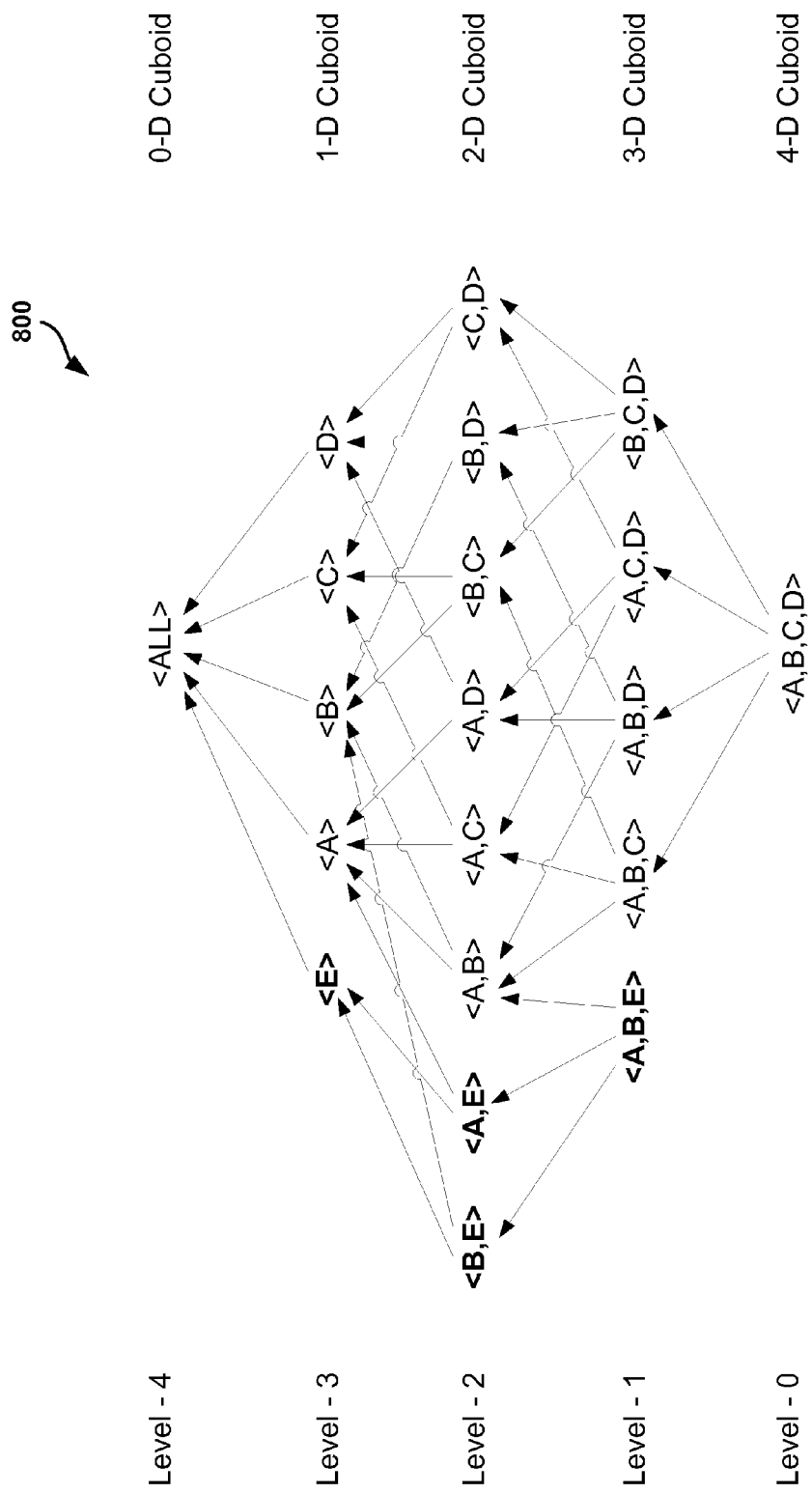
FIG. 8 is an illustration of an example hyper-lattice of cuboids comprising two base cuboids.

FIG. 8 illustrates an example of a conceptual cuboid data structure having two base cuboids, referred to as a hyper-lattice. The term "hyper-lattice" may be generally used to describe a data structure having n base cuboids (where n=1 to infinity). Thus, the term "lattice" is used to describe a specific type of hyper-lattice, where n=1.

Hyper-lattice 800 includes a couple of lattices, one having base cuboid <A, B, E> and another having base cuboid <A, B, C, D>. The hyper-lattice 800 differs from lattice 600 in FIG. 6 in that fact data represented by hyper-lattice 800 cannot be summarized across all combinations of dimensions in the hyper-lattice. For example, hyper-lattice 800 illustrates the addition of a new dimension E, where fact data for dimension E may exist for only a limited subset of other dimensions, say, B and E. Instead of creating and storing a new lattice having a base cuboid <A,B,E> and six intermediate dimension patterns <B,E>, <A,E>, <A,B>, <E>, <A>, and <B>, the new dimension patterns can be merged with existing dimension patterns of lattice 600 to form hyper-lattice 800. This realizes a storage space savings in the data warehouse resulting from not having to create and store indications of the dimension patterns that already exist in the data warehouse within lattice 600 (i.e., dimension patterns <A>, <B>, and <A,B>). The new base cuboid <A,B,E> and new dimension patterns <B,E> and <A,E> can point to and reference the existing dimension patterns of lattice 600 to complete the hyper-lattice.

Dimension patterns that can be generated from a base cuboid are said to correspond to that base cuboid. Thus, in a hyper-lattice, a dimension pattern may correspond to one, some, or all of that hyper-lattice's base cuboids. For example, in hyper-lattice 800, dimension pattern <B,E> corresponds to base cuboid <A,B,E>, whereas dimension pattern <A,B> corresponds to both base cuboid <A,B,E> and base cuboid <A,B,C,D>.

By way of example, an analyst may be working with a particular cuboid, say cuboid 304 of FIG. 3B, which illustrates fact data summarized on a "Type" dimension and a "Time" dimension. Cuboid 304 may be represented in a hyper-lattice (e.g., lattice 600) by a particular dimension pattern (e.g., level 2 dimension pattern <A,B>) in that lattice.

The analyst may desire to view fact data summarized across different dimensions, (e.g., "Type" and "Salesperson"). In response to a request for such a cuboid, an OLAP server may query the existing lattice in the data warehouse and determine that no "Salesperson" dimension data exists. The OLAP server may accordingly query other data warehouses in order to determine if such data exists. If so, then the OLAP server and corresponding data warehouse may retrieve the data and insert a new base cuboid in the existing hyper-lattice (e.g., lattice 600) thus forming a hyper-lattice with an additional base cuboid (e.g., hyper lattice 800 having two base cuboids). The new base cuboid is inserted at one level below the existing dimension pattern of the point of insertion. Therefore, if the point of insertion is the level 2 dimension pattern <A,B>, then new base cuboid <A,B,E> will be inserted at level 1 of the hyper-lattice. Dimension patterns <B,E>, <A,E>, and <E> (indicated by bold typeface on FIG. 8) may be formed and appropriately linked with the new base cuboid <A,B,E>. The new base cuboid, and upper level dimension patterns may also link to existing dimension patterns <A,B>, <A>, and <B>.

An OLAP server may also add the new dimension (i.e., E) to the existing Tag Number Table and assign the new dimension a unique tag number as illustrated by Table 5.

TABLE 5

| Dimension Name | Tag Number |
|---|---|
| A | 0 |
| B | 1 |
| C | 2 |
| D | 3 |
| E | 4 |

Table 6 illustrates a Base Cuboid Table that may be updated in response to forming the new base cuboid <A,B,E> in hyper-lattice 800. The tagged-value of base cuboid <A,B,E> may also be computed as $2^0+2^1+2^4=19$ and stored in the Base Cuboid Table. If the dimension E is added again at a different position in the hyper-lattice, thus forming a new base cuboid, the Base Cuboid Table is updated accordingly, whereas the Tag Number Table is not.

TABLE 6

| Base Cuboid Pattern | Tagged-value | Level |
|---|---|---|
| <A,B,C,D> | {15} | 0 |
| <A,B,E> | {19} | 1 |

Figure 9:
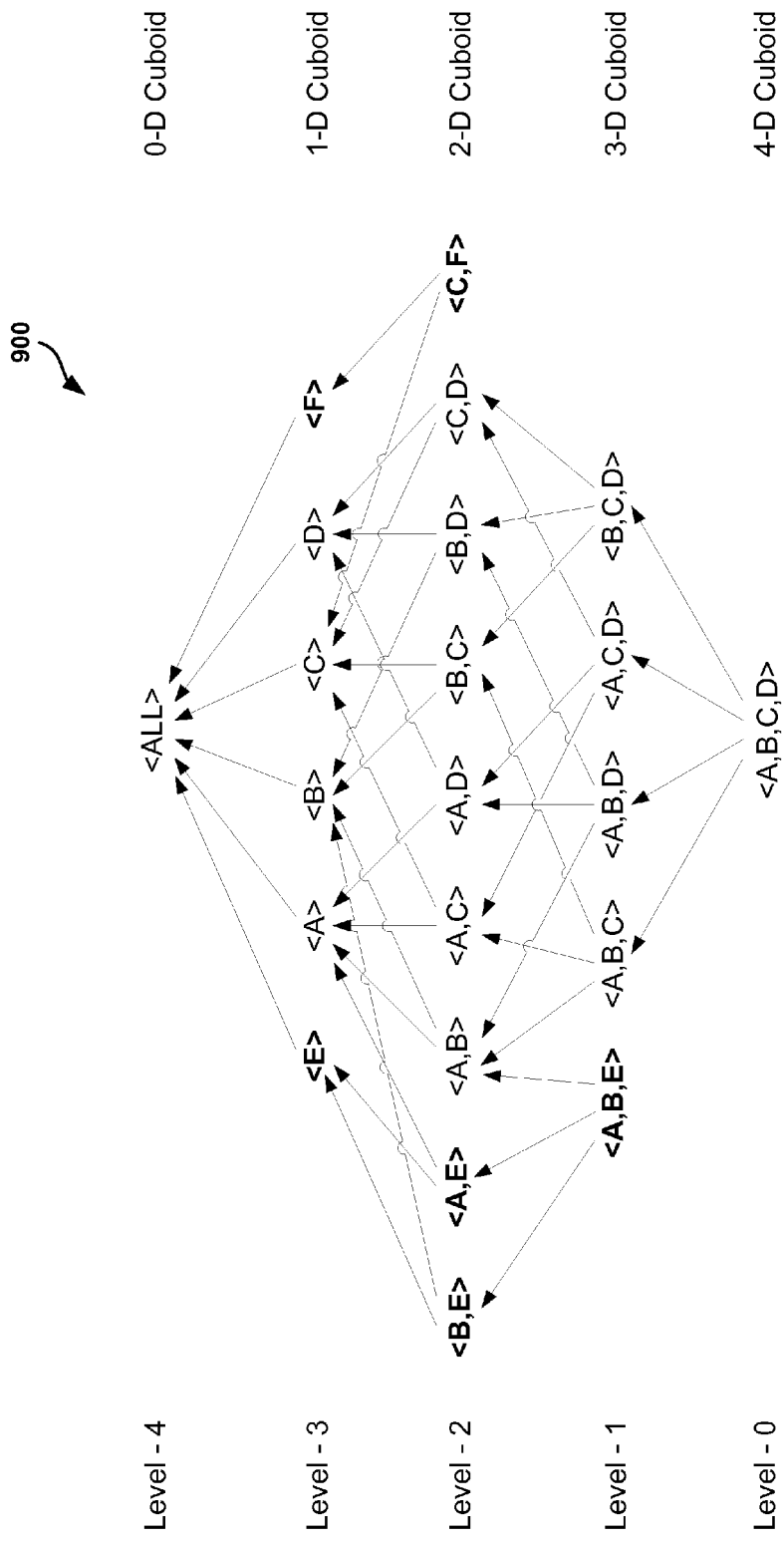
FIG. 9 is an illustration of an example hyper-lattice of cuboids comprising three base cuboids.

FIG. 8 illustrates a hyper-lattice having two base cuboids, however any number of base cuboids are possible in a hyper-lattice. FIG. 9 illustrates an example hyper-lattice 900 having three base cuboids <A,B,C,D>, <A,B,E>, and <C,F>. Each of the dimension patterns in hyper-lattice 900 may be used as a source cuboid or a destination cuboid in an optimal path determination algorithm, such as the algorithm described with reference to flow diagram 700.

By way of example, cuboid <B> may be a desired destination cuboid, whereas base cuboid <A,B,E> may be the desired source cuboid. As mentioned above, generating a higher level cuboid from a lower level cuboid may be referred to as a roll-up operation. In order to determine an optimal path between the two cuboids, first the cuboids able to be generated from base cuboid <A,B,E> are determined as <B,E>, <A,E>, and <A,B>. Of these three determined cuboids, the cuboids that can be used to generate the destination cuboid are determined as <B,E> and <A,B>. Of these two determined cuboids, the one that has the smallest size is determined. If, for example, cuboid <A,B> has a smaller size than cuboid, <B,E>, then the optimal path between cuboid <A,B,E> and <B> includes cuboid <A,B>. This path may be represented as an array of tagged-values (i.e., {19,3,2}.

By way of another example, cuboid <A> may be a desired source cuboid, whereas cuboid <A,B,E> may be the desired destination cuboid. As mentioned above, generating a lower level cuboid from a higher level cuboid may be referred to as a drill-down operation. In order to determine an optimal path between the two cuboids, first the cuboid able to be drilled-down to from cuboid <A> are determined as <A,E>, <A,B>, <A,C>, and <A,D>. Of these four determined cuboids, the cuboids that can be used to drill-down towards the destination cuboid are determined as <A,B> and <A,E>. Of these two determined cuboids, the one that has the smallest size is determined. If, for example, cuboid <A,E> has a smaller size than cuboid <A,B>, then the optimal path between cuboid <A> and <A,B,E> includes cuboid <A,E>. This path may be represented as an array of tagged values (i.e., {1,17,19}).

Figure 10:
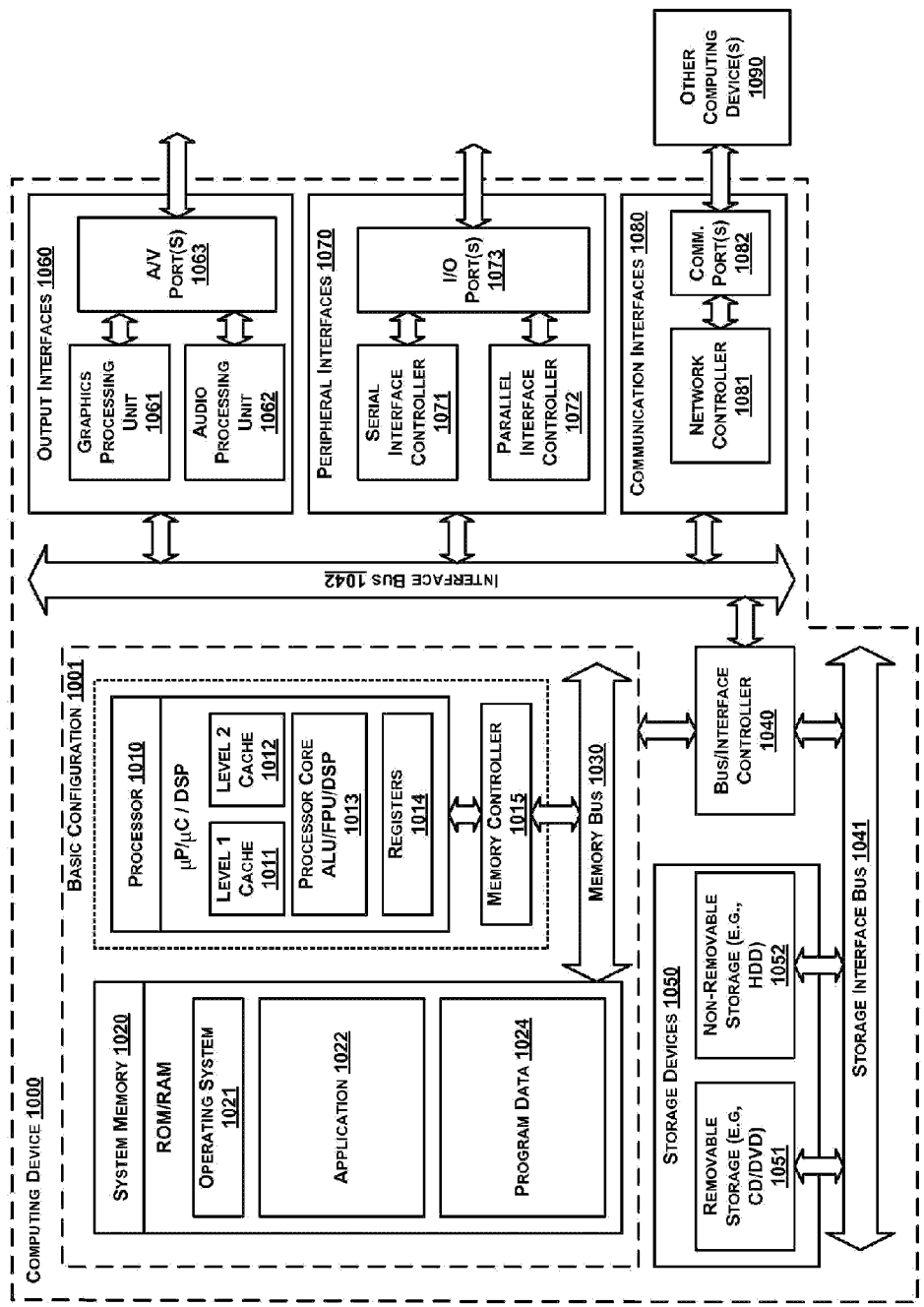
FIG. 10 is a block diagram illustrating an example computing device arranged for generating software instructions to carry out at least some embodiments presented herein.

FIG. 10 is a block diagram illustrating an example computing device 1000 that may be coupled with, integrated in, or embodied by any one of entities 102, 104, 106, 108, and/or 110. In a very basic configuration 1001, computing device 1000 typically includes one or more processors 1010 and system memory 1020. A memory bus 1030 can be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations the memory controller 1015 can be an internal part of the processor 1010.

Depending on the desired configuration, the system memory 1020 can be of any type including but not limited to volatile memory (such as RAM), nonvolatile memory (such as ROM, flash memory, etc.) or any combination thereof. System memory 1020 typically includes an operating system 1021, one or more applications 1022, and program data 1024. System memory 1020 may store one or more computer program products as will be generally described with respect to FIG. 11.

Computing device 1000 can have additional features or functionality, and additional interfaces to facilitate communications between the basic configuration 1001 and other entities. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. In accordance with at least some embodiments described herein, data storage devices 1050 may serve as a repository for data stored in data warehouse 108. Additionally or alternatively, data storage devices 1050 may store a representation of a data lattice (e.g., lattice 600 or hyper-lattice 800).

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output interfaces 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external device such as input devices (e.g., keyboard, mouse, pen, voice input device, touch input device, etc.) or other peripheral devices (e.g., printer, scanner, etc.) via one or more I/O ports 1073.

An example communication interface 1080 includes a network controller 1081, which can be arranged to facilitate communications with one or more other computing devices 1090 over a network communication via one or more communication ports 1082. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media (or medium) as used herein can include storage media, and computer communications can include communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

Figure 11:
FIG. 11 is a schematic illustrating a partial view of an example computer program product that includes a computer program for executing a computer process on a computing device, arranged according to at least some embodiments presented herein.

FIG. 11 is a schematic illustrating a conceptual partial view of an example computer program product 1100 that includes a computer program for executing a computer process on a computing device, arranged according to at least some embodiments presented herein. An illustrative embodiment of the example computer program product 1100 is provided using a signal bearing medium 1102. Signal bearing medium 1102 may include one or more instructions 1104 that, when executed by, for example, a processor, may provide the functionality or portions of the functionality described above with respect to FIGS. 1-10. Thus, for example, referring to flow diagram 700, one or more features of blocks 702, 704, 706, 708, 710, 712, 714, 716, and/or 718 of FIG. 7 may be undertaken by one or more instructions associated with signal bearing medium 1102.

The one or more instructions may be, for example, computer executable and/or logic implemented instructions. In some embodiments, the signal bearing medium 1102 of the one or more computer program products 1100 include a computer readable medium 1106, a recordable medium 1108, and/or a communications medium 1110. In some examples, a computing device such as computing device 1000 of FIG. 10 may be configured to provide the various operations, function, or actions in response to instructions 1104 conveyed to device 1000 by medium 1102.

In some implementations, signal bearing medium 1102 may encompass a computer-readable medium 1106, such as, but not limited to, a hard disk drive, a Compact Disc (CD), a Digital Video Disk (DVD), a digital tape, memory, etc. In some implementations, signal bearing medium 1102 may encompass a recordable medium 1108, such as, but not limited to, memory, read/write (R/W) CDs, R/W DVDs, etc. In some implementations, signal beating medium 1102 may encompass a communications medium 1110, such as, but not limited to, a digital and/or an analog communication medium (e.g., a fiber optic cable, a waveguide, a wired communications link, a wireless communication link, etc.). Thus, for example, computer program product 1100 may be conveyed to one or more modules of the described systems by an RF signal bearing medium 1102, where the signal bearing medium 1102 is conveyed by a wireless form of communications medium 1110 (e.g., a wireless communications medium conforming with the IEEE 802.11 standard).

The present disclosure is not to be limited in terms of the particular embodiments described in this application, which are intended is illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or materials, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer readable storage medium (CRM) having instructions stored thereon, which when executed by a computing device, causes the computing device to perform functions, the functions comprising:
   in a hyper-lattice representation of possible cuboid dimension patterns, determining a set of intermediate cuboids, which represent data summarized on dimensions, that may be generated from a source cuboid in the hyper-lattice,
   wherein the hyper-lattice comprises two or more base cuboids at the lowest level of summarization,
   wherein at least one dimension pattern of the possible cuboid dimension patterns corresponds to a first base cuboid and at least one other dimension pattern of the possible cuboid dimension patterns corresponds to the first base cuboid and a second base cuboid, and
   wherein the hyper-lattice is formed by merging the at least one dimension pattern with the at least one other dimension pattern of the possible cuboid dimension patterns;
   determining which intermediate cuboids in the set are summarized on at least the same dimensions as a destination cuboid in the hyper-lattice;
   calculating a size of each intermediate cuboid in the set that is summarized on at least the same dimensions as the destination cuboid in the hyper-lattice;
   determining, based on the calculated sizes, a given intermediate cuboid that has a smallest size; and
   determining, as an optimal path through the hyper-lattice to the destination cuboid from the source cuboid, a path that includes at least the given intermediate cuboid.

2. The non-transitory CRM of claim 1, wherein the destination cuboid corresponds to each of the first base cuboid and the second base cuboid.

3. The non-transitory CRM of claim 1, wherein the source cuboid and the destination cuboid each correspond to different base cuboids.

4. The non-transitory CRM of claim 1, wherein the functions further comprise:
   determining a second set of intermediate cuboids, which represent data summarized on dimensions, that may be generated from the source cuboid in the hyper-lattice;
   determining which intermediate cuboids in the second set are summarized on at least the same dimensions as the destination cuboid in the hyper-lattice;
   calculating a size of each intermediate cuboid in the second set that is summarized on at least the same dimensions as the destination cuboid in the hyper-lattice;
   determining based on the calculated sizes, a given second intermediate cuboid that has a smallest size; and
   determining, as an optimal path through the hyper-lattice to the destination cuboid from the source cuboid, a path that includes at least (i) the given intermediate cuboid and (ii) the second given intermediate cuboid.

5. The non-transitory CRM of claim 1, wherein each cuboid of the set of intermediate cuboids is summarized on one less dimension that the number of dimensions on which the source cuboid is summarized.

6. The non-transitory CRM of claim 1, wherein the calculating the size of each intermediate cuboid comprises calculating the number of data cells associated with each intermediate cuboid.

7. The non-transitory CRM of claim 1, wherein the functions further comprise:
   assigning a different tag number to each different dimension on which the possible cuboid dimension patterns in the hyper-lattice are summarized, wherein each different tag number is a unique whole number; and
   assigning a different tagged-value to each given dimension pattern in the hyper-lattice, wherein each tagged-value of each given dimension pattern is a sum of a specific set of tag numbers taken as exponents of 2, the specific set of tag numbers comprising the tag numbers assigned to dimensions on which the given dimension pattern is summarized.

8. The non-transitory CRM of claim 7, wherein the determining which intermediate cuboids in the set are summarized on at least the same dimensions as the destination cuboid in the hyper-lattice comprises:
   for each given cuboid in the set, determining tagged-values of the dimensions on which the given cuboid is summarized; and
   determining as a cuboid that is summarized on at least the same dimensions as the destination cuboid, a cuboid that is assigned tagged-values that at least comprise the tagged-values assigned to the destination cuboid.

9. An online analytical processing (OLAP) server comprising:
   a computing device;
   memory storage coupled to the computing device; and
   instructions stored in the memory storage, which when executed by the computing device, cause the computing device to carry out operations, the operations comprising:
   determining an optimal path through a hyper-lattice for which to generate a destination cuboid from a source cuboid, the hyper-lattice representing possible cuboid dimension patterns, wherein the optimal path includes one or more intermediate cuboids,
   wherein the hyper-lattice comprises two or more base cuboids at the lowest level of summarization,
   wherein at least one dimension pattern of the possible cuboid dimension patterns corresponds to a first base cuboid, and at least one other dimension pattern of the possible cuboid dimension patterns corresponds to the first base cuboid and a second base cuboid, and
   wherein the hyper-lattice is formed by merging the at least one dimension pattern with the at least one other dimension pattern of the possible cuboid dimension patterns;
   generating the destination cuboid via the determined optimal path; and
   providing to a client device, a representation of the generated destination cuboid.

10. The OLAP server of claim 9, wherein the optimal path through the hyper-lattice for which to generate the destination cuboid from the source cuboid is a specific path of a plurality of paths through the hyper-lattice, wherein each path of the plurality of paths through the hyper-lattice is a path for which to generate the destination cuboid from the source cuboid.

11. The OLAP server of claim 10, wherein the each path of the plurality of paths through the hyper-lattice comprises one or more possible cuboid dimension patterns, and wherein the optimal path includes the smallest aggregate cuboid size.

12. The OLAP server of claim 9, wherein the determining the optimal path through the hyper-lattice for which to generate the destination cuboid from the source cuboid comprises:
   determining, based on the hyper-lattice, a set of intermediate cuboids that may be generated from the source cuboid in the hyper-lattice;

determining which intermediate cuboids in the set are summarized on at least the same dimensions as the destination cuboid in the hyper-lattice;

calculating a size of each intermediate cuboid in the set that is summarized on at least the same dimensions as the destination cuboid in the hyper-lattice;

determining, based on the calculated sizes, a given intermediate cuboid that has a smallest size; and determining, as an optimal path through the hyper-lattice to the destination cuboid from the source cuboid, a path that includes the given intermediate cuboid.

13. The OLAP server of claim 12, wherein the instructions further comprise:

assigning a different tag number to each different dimension on which the possible cuboid dimension patterns in the hyper-lattice are summarized, wherein each different tag number is a unique whole number; and assigning a different tagged-value to each given dimension pattern in the hyper-lattice, wherein each tagged-value of each given dimension pattern is a sum of a specific set of tag numbers taken as exponents of 2, the specific set of tag numbers comprising the tag numbers assigned to dimensions on which the given dimension pattern is summarized.

14. The OLAP server of claim 13, wherein the determining which intermediate cuboids in the set are summarized on at least the same dimensions as the destination cuboid in the hyper-lattice comprises:

for each given cuboid in the set, determining tagged-values of the dimensions on which the given cuboid is summarized; and determining as a cuboid that is summarized on at least the same dimensions as the destination cuboid, a cuboid that is assigned tagged-values that at least comprise the tagged-values assigned to the destination cuboid.

15. The OLAP server of claim 9, wherein each base cuboid of the two or more base cuboids is summarized on a different set of dimensions, and wherein the source cuboid and the destination cuboid each correspond to different base cuboids of the hyper-lattice.

16. The OLAP server of claim 9, wherein each base cuboid of the two or more base cuboids is summarized on a different set of dimensions, and wherein the source cuboid and the destination cuboid each correspond to the same base cuboid of the hyper-lattice.

* * * * *

UNITED STATES PATENT AND TRADEMARK OFFICE
CERTIFICATE OF CORRECTION

| | |
|---|---|
| PATENT NO. | : 9,002,782 B2 |
| APPLICATION NO. | : 13/496705 |
| DATED | : April 7, 2015 |
| INVENTOR(S) | : Chaki et al. |

Page 1 of 1

It is certified that error appears in the above-identified patent and that said Letters Patent is hereby corrected as shown below:

IN THE SPECIFICATION

In Column 1, Line 14, delete "U.S.C. 371" and insert -- U.S.C. § 371 --, therefor.

In Column 1, Line 18, delete "TECHNICAL MELD" and insert -- TECHNICAL FIELD --, therefor.

In Column 1, Line 26, delete "Unless, otherwise" and insert -- Unless otherwise --, therefor.

In Column 1, Line 46, delete "across, the" and insert -- across the --, therefor.

In Column 2, Line 14, delete "dimension as" and insert -- dimensions as --, therefor.

In Column 4, Line 16, delete "dimension." and insert -- dimensions. --, therefor.

In Column 4, Line 25, delete "upon, how" and insert -- upon how --, therefor.

In Column 5, Line 53, delete "cost than" and insert -- costs than --, therefor.

In Column 8, Line 13, delete "tag-value <A,B,C>" and insert -- tag-value of <A,B,C> --, therefor.

In Column 8, Line 64, delete "Table 3 that" and insert -- Table 3, that --, therefor.

In Column 11, Line 12, delete "cuboid able" and insert -- cuboids able --, therefor.

In Column 12, Line 29, delete "external device" and insert -- external devices --, therefor.

In Column 13, Line 27, delete "signal beating medium" and insert -- signal bearing medium --, therefor.

In Column 13, Line 40, delete "is illustrations" and insert -- as illustrations --, therefor.

Signed and Sealed this
Thirteenth Day of October, 2015

Michelle K. Lee
*Director of the United States Patent and Trademark Office*